Sept. 22, 1959 R. S. EMERSON 2,905,457
HYDRAULIC SPEED GOVERNING MECHANISM FOR PRIME MOVERS
Filed April 1, 1957 2 Sheets-Sheet 1

Inventor
R.S. Emerson

Sept. 22, 1959        R. S. EMERSON        2,905,457
HYDRAULIC SPEED GOVERNING MECHANISM FOR PRIME MOVERS
Filed April 1, 1957        2 Sheets—Sheet 2
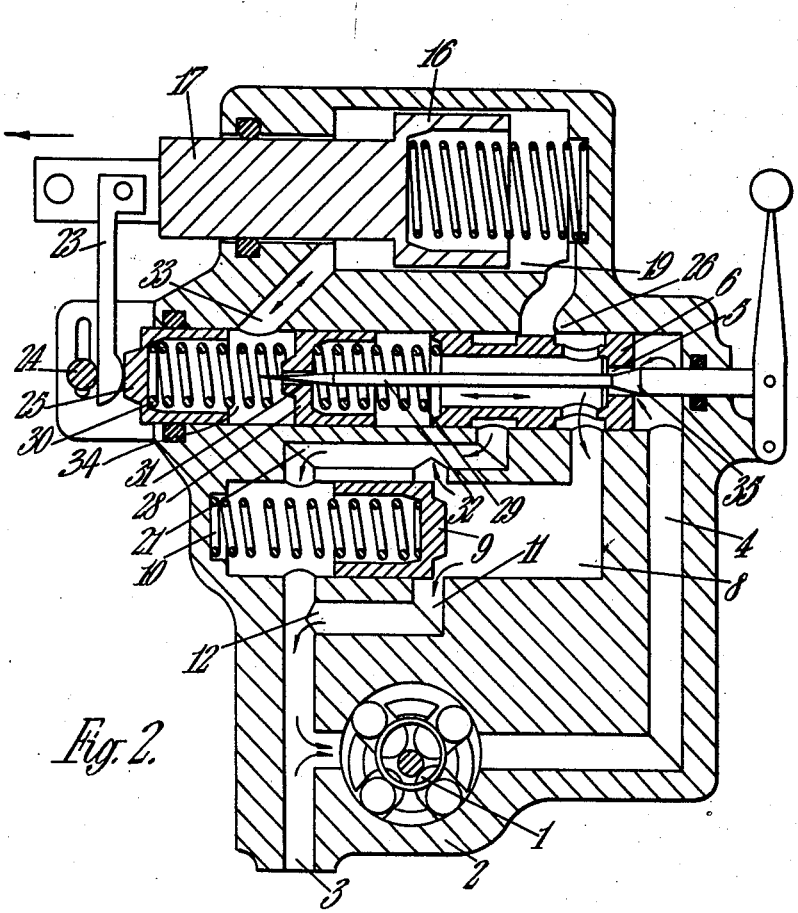
Inventor
R. S. Emerson

United States Patent Office 2,905,457
Patented Sept. 22, 1959

2,905,457

HYDRAULIC SPEED GOVERNING MECHANISM FOR PRIME MOVERS

Reginald Stanley Emerson, Staines, England, assignor to Bryce Berger Limited, Staines, England Application April 1, 1957, Serial No. 649,780

Claims priority, application Great Britain April 5, 1956

7 Claims. (Cl. 264—3)

This invention relates to speed governing apparatus of the type in which a hydraulic fluid is fed from a pump driven by the prime mover to a system of springs and plungers arranged to control the speed of the prime mover by mechanically operating the torque controlling mechanism of the prime mover.

The invention has for its object to provide simplified speed governing mechanism.

In accordance with the present invention some or all of the following main components are employed: A suitable pump adapted to be driven by the prime mover, a servo valve provided with a number of lands for the purpose of cutting off ports in the surface of the bore in which it is axially slidably situated, a spring or springs arranged so as to bias the said servo valve in one direction, an abutment for the said springs at their end remote from the servo valve, a servo piston axially slidable in a second bore provided with porting communication with the first in such a way that a small displacement of the servo valve on either side of a datum position causes the servo piston to travel to the appropriate extremity of its stroke, a second piston referred to as an accumulator piston which is biased by a spring towards one end of the bore in which it is axially slidable, said bore being provided with a further port which is uncovered by the accumulator piston when it is displaced by a predetermined amount towards the spring, a third piston arranged concentrically with the servo valve and on the same side of it as the spring or springs which will be referred to as the speeder springs and which if this piston is fitted would be provided in sections located on each side of the piston so that the piston is intermediate of them, a floating lever pivotally connected to or abutting against the speeder spring abutment and the servo piston rod, a second abutment arranged to be slidable in one or two planes so as to contact any intermediate or other point of the opposite side of the aforesaid lever and also so as to be capable of adjustment at right angles to the lever, an orifice which may be provided with an adjustable needle so as to control its area, said orifice so arranged that its upstream side is connected by suitable conduits to the outlet of the pump and also to the side of the servo valve opposite from the speeder spring and so that its downstream side is connected by suitable conduits to the opposite side of the accumulator piston from its biasing spring or any other corresponding point; a further spring may also be provided if desired so as to bias the servo piston towards the direction to reduce fuel; a second orifice may also be provided communicating with either side of the piston intermediate of the speeder springs which may also be controlled by a second needle which in turn may be associated with or part of the first needle. The whole of the aforesaid mechanism may be included but not necessarily so in a single housing and in particular the pump may also be included in the housing or may be a separate unit driven by the prime mover and connected to the housing by suitable conduits.

The invention consists in a hydraulic unit for controlling the speed of a prime mover having features as set forth in the claims appended hereto.

Typical speed sensing mechanism is illustrated in Figure 1 and Figure 2 of the diagrammatic drawings in which:

Figure 2 is a similar view of a modified form thereof;

Figures 3 and 4 are sectional views of alternative details relating to Figure 2.

Figure 1:
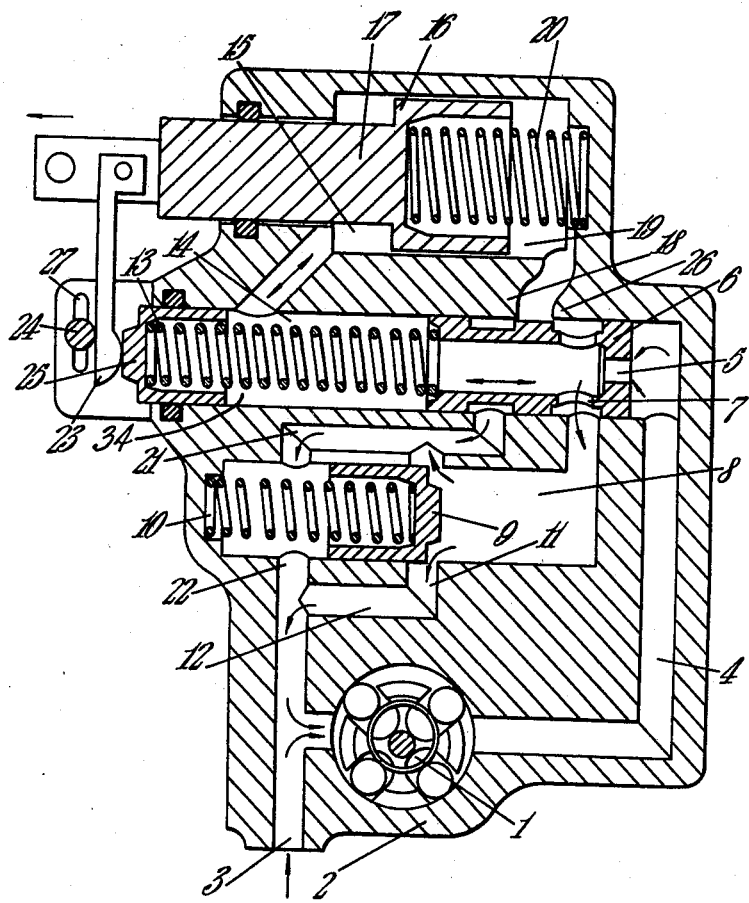
Figure 1 is a sectional view of one convenient form of speed sensing mechanism embodying the present invention.

In carrying the invention into effect according to one simple form illustrated by way of example in Figure 1:

A positive displacement pump 1 driven by a prime mover draws hydraulic fluid which enters a housing 2 through conduit 3 and delivers it under pressure into conduit 4 at a rate of flow substantially proportional to the speed of the engine. The fluid then passes through an orifice 5 in a servo valve 6 through a passage 7 and into an accumulator chamber 8. This causes the accumulator piston 9 to move against its spring 10 until a port 11 is opened allowing the fluid to pass through conduit 12 back to the pump.

When the engine is running at a steady speed under a steady load, all the space in the housing is filled with fluid and the whole of the governing mechanism is in equilibrium. The pressure built up inside the accumulator chamber 8 due to the pressure of spring 10 obtains also in chamber 14 and in chamber 15 which is the differential space between a servo piston 16 and its associated rod 17. Servo piston rod 17 is connected to the torque controlling mechanism of the prime mover.

If the load on the prime mover is now increased its speed will fall and the flow discharged from pump 1 all of which passes through orifice 5 will sympathetically fall whilst pressure in chambers 8, 14 and 15 will remain substantially constant due to the action of accumulator piston 9 and its spring 10. The effect of the falling flow rate through orifice 5 will cause the pressure in conduit 4 and therefore the force acting on the end of the servo valve adjacent to conduit 4 also to fall and the servo valve itself will therefore no longer be in equilibrium; it will in fact move under the influence of spring 13 until port edges 18 open. This will allow fluid in chamber 19, which was at a pressure determined by the pressure in chamber 15, the differential areas of the servo piston and the force of spring 20, to pass round the annulus of the servo valve and through conduit 21 and conduit 22 back to the pump inlet. When port edges 18 open, therefore, the servo piston 16 moves to the right in Figure 1 to move the prime mover torque control so as to increase its torque output; at the same time however, due to the action of a lever 23 and adjustable abutment 24 the speeder spring abutment 25 moves slightly away from the servo valve 6 and consequently reduces the spring force acting on it. The reduction of this force therefore permits the servo valve 6 to move back to its datum position when port edges 18 and 26 are again both closed and the system will again be in equilibrium, but the engine will be running at a lower speed and at a higher torque.

Thus a speed droop characteristic as load on the prime mover is increased and vice-versa is produced.

It will also be noted that a form of servo mechanism is provided which can produce ample force for the operation of the torque control mechanism of the prime mover, since only a slight change in speed can produce a large pressure difference across the servo piston 16 and so exert a considerable force to operate the mechanism.

Furthermore there is development of a greater instantaneous power than that being absorbed by the pump operated by the prime mover due to the presence of the accumulator chamber 8, accumulator piston 9 and its accompanying spring 10. If the speed of the prime mover rises rapidly due to a sudden load shed, then it may be necessary for the servo piston 16 to move to close down the torque control of the prime mover at a greater rate than could be satisfied by the rise in flow rate from the pump 1. If this occurs the pressure in chamber 8 will fall slightly but will be maintained substantially constant due to the accumulator spring acting on piston 9 which will cause the fluid in chamber 8 to be discharged via the servo valve port 26 into the servo piston chamber 19 and so make up for the deficiency in flow from pump 1 so that in fact the instantaneous power developed by the servo piston rod 17 could exceed the steady power absorption of the pump.

Adjustment of the abutment 24 in its slot 27 varies the amount of feed back from servo piston rod 17 to speeder spring abutment 25 and so provides a convenient means of adjusting the amount of speed droop. If however, abutment 24 is moved too close to the extremity of the lever 23 adjacent to the speeder spring abutment 25, then there may be too little speed droop and instability may develop.

In order to avoid this difficulty a modified arrangement as shown by way of example in Figure 2 may be used in which a speeder spring in two sections 29 and 30 is provided interposed between which is a piston 28 provided with a small bleed orifice 31 into which fits a tapered needle 32. With this arrangement if the servo piston 16 moves say to the left, fluid will pass down the conduit 33 into chamber 34 and the piston 28 will be caused to move to the right and speeder spring 29 will be compressed exerting a greater force on servo valve 6 in exactly the same manner as obtained in Figure 1 due to the feed back lever 23.

Consider now that the whole system is in equilibrium and that abutment 24 is in such a position in its slot so as to prevent any feed back from the servo piston rod 17 to spring abutment 25. If load is now shed from the prime mover its speed will increase, servo valve 6 will move to the left and admit pressure fluid to chamber 19 which will move the servo piston 16 to the left and fuel to the prime mover will be reduced, but at the same time fluid will be displaced from the opposite side of the servo piston through conduit 33 into chamber 34 and piston 28 will be caused to move to the right increasing the load on spring 29 and the force on servo valve 6 until it is again centralised on its datum position and ports 26 are again closed. The engine will now be running at a higher speed and lower torque but since the speeder springs 29 and 30 are out of balance there will be a force acting on piston 28 tending to move it to the left and due to the presence of orifice 31 it will gradually move to the left reducing the compression of speeder spring 29 and consequently the force it exerts on the servo valve 6. The servo valve 6 will therefore move slightly to the left and admit further fluid through ports 26, and in consequence servo piston 16 will move further in the direction to reduce torque and the prime mover will slow down a little.

Further motion of the servo piston to the left will of course at the same time tend to hold piston 28 in its original position but not entirely, and the process will continue until there is no longer any differential pressure across piston 28. When this occurs the load exerted on the servo valve 6 by the combined speeder springs 29 and 30 will be as it was before load was shed and therefore the engine will have regained its original speed. In this way a temporary speed droop characteristic which comparatively slowly dies away after the load on the prime mover has been increased and vice-versa is achieved.

The selection of the speed at which it is desired the prime mover shall run, is achieved in the arrangement of Figure 2 by the provision of a needle valve 35 which is slidably located in the housing and forms a variable restriction in orifice 5. If the needle valve 35 is inserted into orifice 5 so that its area is reduced, the pressure drop across the orifice will be increased and the servo valve will be caused to move to the left which will open ports 26 and cause the servo piston to reduce the amount of fuel delivered to the prime mover, which will in sympathy slow down, until the same pressure difference obtains across the orifice as did before. The servo valve will by now have returned to its datum position but the engine will be running at a reduced speed. By suitable setting, therefore, of the needle valve 36, the prime mover can be made to run at any desired speed within its capabilities.

It will be observed that in Figure 2 needle 32 is shown integral with needle 35. In some cases this may be found desirable since the position of needle 32 will control the rate at which the temporary speed droop dies away and by associating this needle with the speed selector needle 35 it can be arranged to die away at the most suitable rate consistent with the particular speed setting obtaining. Means enabling the rate at which the temporary speed droop dies away to be a function of the selected speed of the prime mover are thus provided.

In cases where the needle 32 is not required to be integral with the needle 35, then it is not essential for the needle 35 or orifice 5 to be located at this point.

It will be seen that orifice 5 can in fact be situated anywhere so long as it forms a communication between the outlet of pump 1 and accumulator chamber 8. Likewise if means are not required for enabling the rate at which the temporary speed droop dies away to be a function of the selected speed of the prime mover are as would be the case with fixed speed applications, then orifice 31 and needle 32 may be more conveniently located so that for example the needle would be adjustable manually and externally.

Figures 3 and 4 show alternative positions for both these orifices 31 and 5.

I claim:

1. A hydraulic unit for controlling the speed of a prime mover comprising in combination a pump driven by the prime mover for displacing a hydraulic medium through a hydraulic system, a first cylinder containing a valve and two pistons all axially slidable therein, a first of said pistons being in the centre, a spring at each side of said central piston, one of said springs bearing at one end against the valve and at the other against the central piston and the other of said springs bearing at one end against the central piston and at the other against the second piston, an actuating piston contained in a second cylinder for effecting control of the prime mover, said actuating piston dividing said second cylinder into two chambers, a passageway between one of said chambers communicating with a space between the first and second pistons, the other chamber communicating with a port in the first-mentioned cylinder communicating with the space between the valve and central piston and controlled by said valve, a piston rod for said actuating piston, a lever interposed at one end between an adjustable stop and the outermost of the two pistons contained in the first-mentioned cylinder, the other end coacting with the piston rod, a passage for the high-pressure hydraulic medium to the interior of the first cylinder between the valve and the end of said first cylinder, an accumulator chamber communicating with the interior of the first cylinder, a variable area restriction between the passage and accumulator chamber for building up a pressure difference in the hydraulic system acting on the valve in opposition to the force of said two springs, and means in the accumulator chamber for building up a predetermined pressure for operating the actuating piston.

2. A hydraulic control unit according to claim 1 in which a bleed orifice having a variable area is located in the central piston so as to control communication between spaces on each side thereof.

3. A hydraulic control unit according to claim 1 in which said variable area restriction is manually controlled.

4. A hydraulic control unit according to claim 3 in which the manually variable restriction includes an orifice in the end wall of the valve.

5. A hydraulic control unit according to claim 4 in which a mechanical connection is provided between said manually variable restriction and the said bleed orifice, to effect simultaneous manual control thereof.

6. A hydraulic control unit according to claim 1 in which said means for building up a predetermined pressure comprises a spring-biased axially slidable member in the accumulator chamber acted on by the hydraulic medium and adapted to open relief passages when the predetermined pressure is reached.

7. A hydraulic control unit according to claim 6 in which said axially slidable member is adapted to be displaced an appreciable distance so as to accumulate a quantity of the hydraulic medium under pressure before opening said relief passages.

References Cited in the file of this patent

UNITED STATES PATENTS

| | | |
|---|---|---|
| 2,364,817 | Reggio | Dec. 12, 1944 |
| 2,481,334 | Nicolls | Sept. 6, 1949 |
| 2,567,495 | Nicolls | Sept. 11, 1951 |
| 2,650,815 | Feilden et al. | Sept. 1, 1953 |
| 2,756,982 | Tuscher | July 31, 1956 |